United States Patent
Janardhan et al.

(10) Patent No.: US 8,660,758 B2
(45) Date of Patent: Feb. 25, 2014

(54) PAYLOAD SYSTEM WITH CENTER OF GRAVITY COMPENSATION

(75) Inventors: Vijayakumar Janardhan, Washington, IL (US); Jeffrey Kent Berry, Yorkville, IL (US); Brian Mintah, Washington, IL (US); Everett Gene Brandt, Brimfield, IL (US); Robert J. Price, Dunlap, IL (US); Kevin Dwight King, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 981 days.

(21) Appl. No.: 11/998,401

(22) Filed: Nov. 30, 2007

(65) Prior Publication Data

US 2009/0143896 A1    Jun. 4, 2009

(51) Int. Cl.
  *G01G 19/08* (2006.01)
  *B65F 3/02* (2006.01)

(52) U.S. Cl.
  USPC ............. 701/50; 701/124; 177/139; 177/141; 177/25.19; 414/21; 414/22.54

(58) Field of Classification Search
  USPC .......... 701/99–115, 34.4, 50, 124; 177/25.14, 177/25.19, 136, 139, 141; 414/21, 22.54, 414/22.55
  See application file for complete search history.

(56) References Cited

U.S. PATENT DOCUMENTS

| | | | |
|---|---|---|---|
| 2,635,868 A | 4/1953 | Reid et al. | |
| 3,061,117 A | 10/1962 | Kruse | |
| 4,230,196 A | 10/1980 | Snead | |
| 4,499,960 A * | 2/1985 | Ehrich et al. | 177/25.14 |
| 4,627,013 A | 12/1986 | Ichiyama et al. | |
| 4,677,579 A | 6/1987 | Radomilovich | |
| 4,792,004 A | 12/1988 | Sheffield | |
| 4,809,794 A | 3/1989 | Blair et al. | |
| 4,995,468 A | 2/1991 | Fukuda | |

(Continued)

FOREIGN PATENT DOCUMENTS

| | | |
|---|---|---|
| JP | 07-259137 | 10/1995 |
| JP | 2002-129598 | 5/2002 |

(Continued)

OTHER PUBLICATIONS

Tafazoli et al., "Parameter Estimation and Actuator Friction Analysis for a Mini Excavator," Proceedings of the 1996 IEEE International Conference on Robotics and Automation, Minneapolis, Minnesota, Apr. 1996, vol. 1, pp. 329-334.

(Continued)

*Primary Examiner* — Thomas Tarcza
*Assistant Examiner* — Adam Tissot
(74) *Attorney, Agent, or Firm* — Finnegan, Henderson, Farabow, Garrett & Dunner LLP

(57) ABSTRACT

The present disclosure is directed to a payload calculation system for use with a work implement having at least two linkage members. The payload calculation system may have at least one state sensor configured to measure a state of the at least two linkage members. The payload calculation system may also have a processing device in communication with the at least one state sensor. The processing device may account for changes in a center of gravity of each of the at least two linkage members. The processing device may also be configured to use the at least one state sensor to determine a mass of a payload moved by the work implement.

13 Claims, 4 Drawing Sheets

(56) References Cited

U.S. PATENT DOCUMENTS

| | | | |
|---|---|---|---|
| 5,067,572 | A | 11/1991 | Kyrtsos et al. |
| 5,070,953 | A | 12/1991 | Kyrtsos et al. |
| 5,082,071 | A | 1/1992 | Kyrtsos et al. |
| 5,105,896 | A | 4/1992 | Kyrtsos |
| 5,167,287 | A | 12/1992 | Pomies |
| 5,178,226 | A * | 1/1993 | Bowman et al. ............ 177/139 |
| 5,321,637 | A | 6/1994 | Anderson et al. |
| D362,402 | S | 9/1995 | Hite |
| 5,509,293 | A | 4/1996 | Karumanchi |
| 5,714,719 | A | 2/1998 | Otsuka et al. |
| 5,823,369 | A | 10/1998 | Kuromoto |
| 5,824,965 | A | 10/1998 | Fujii et al. |
| 6,052,925 | A | 4/2000 | Reiners |
| 6,072,127 | A | 6/2000 | Oslakovic |
| 6,122,598 | A | 9/2000 | Tanaka et al. |
| 6,211,471 | B1 | 4/2001 | Rocke et al. |
| 6,225,574 | B1 | 5/2001 | Chang et al. |
| 6,518,519 | B1 | 2/2003 | Crane, III et al. |
| 6,552,279 | B1 | 4/2003 | Lueschow et al. |
| 6,789,002 | B1 * | 9/2004 | Hac et al. .......................... 701/1 |
| 6,931,772 | B2 | 8/2005 | Furuno et al. |
| 7,350,787 | B2 * | 4/2008 | Voss ................................ 280/5.5 |
| 2005/0000703 | A1 | 1/2005 | Furuno et al. |
| 2006/0074578 | A1 | 4/2006 | Lueschow |

FOREIGN PATENT DOCUMENTS

| | | | |
|---|---|---|---|
| JP | 2002129598 A * | 5/2002 | |
| JP | 2003-073078 | 3/2003 | |
| JP | 2007-138504 | 6/2007 | |
| JP | 2007138504 A * | 6/2007 | |
| WO | 9842482 | 10/1998 | |
| WO | 2006098645 | 9/2006 | |
| WO | WO 2006098645 A1 * | 9/2006 | |

OTHER PUBLICATIONS

Craig et al., "Adaptive Control of Mechanical Manipulators," IEEE, 1986, pp. 190-195.

Hsu et al., "Adaptive Identification and Control for Manipulators Without Using Joint Accelerations," Robotics and Automation, Proceedings, IEEE International Conference, vol. 4, Mar. 1987, pp. 1210-1215.

Khosla et al., "An Algorithm to Estimate Manipulator Dynamics Parameters," Department of Electrical and Computer Engineering, The Robotics Institute, Carnegie Mellon University, Pittsburgh, PA, Mar. 1987, pp. 1-24.

Tafazoli et al., "Identification of Inertial and Friction Parameters for Excavator Arms," IEEE Transactions on Robotics and Automation, vol. 15, No. 5, Oct. 1999, pp. 966-971.

Pagilla et al., "Adaptive Control of a Robot Carrying a Time-Varying Payload," Proceedings of the 2000 IEEE International Conference on Control Applications, Sep. 2000, pp. 68-73.

Kholsa, "Estimation of Robot Dynamics Parameters: Theory and Application," Carnegie Melon University, Mar. 1987, pp. 1-19.

Tafazoli, "Identification of Frictional Effects and Structural Dynamics for Improved Control of Hydraulic Manipulators," The University of British Columbia, Jan. 1997, pp. 1-150.

* cited by examiner

PAYLOAD SYSTEM WITH CENTER OF GRAVITY COMPENSATION

TECHNICAL FIELD

The present disclosure relates generally to a payload calculation system and, more particularly, to a payload calculation system that accounts for a change in the center of gravity of work implement linkage members.

BACKGROUND

Various types of machines may use a work implement to transfer material from a work site and load this material onto transport vehicles (e.g., trucks and railroad cars). These machines include excavators, wheel loaders, backhoes, and other material moving machines. The transport vehicles that are loaded by the machines may have a particular load capacity determined by a manufacturer's maximum load rating and/or other factors, such as, for example, weight restrictions for on-highway vehicles. To promote maximum utilization of the transport vehicles, it may be desirable to load each transport vehicle as close as possible to its load capacity. Overloading the transport vehicle, however, may have negative consequences. Particularly, placing too much weight on a transport vehicle can significantly increase maintenance costs for the transport vehicle or create costly delays if the excess material is removed prior to transport.

To monitor the weight of the material placed onto each transport vehicle, machine manufacturers have developed payload calculation systems. A payload calculation system may determine the weight of a material currently carried by the work implement (e.g., weight of material in an excavator bucket), as well as the total weight of a material loaded onto a transport vehicle during a particular cycle or time period. For improved productivity, the payload calculation system may determine the weight of a material carried by the machine and/or work implement while the machine and/or work implement is in motion (rather than performing static measurements).

One method for determining the mass moved by a work implement is disclosed in U.S. Pat. No. 6,518,519 (the '519 patent) issued to Crane, III et al. on Feb. 11, 2003. The '519 patent discloses a machine with a chassis, a cab coupled with the chassis, and a boom coupled with the cab. A first actuator is coupled with the boom and the cab, and moves the boom relative to the cab. The machine has a stick coupled with the boom, and a second actuator coupled with the stick and the boom that moves the stick relative to the boom. The machine also has a bucket operable to receive the payload. The bucket is coupled with the stick, and a third actuator is coupled with the bucket and the stick and moves the bucket relative to the stick.

Various sensing devices are used to determine a first joint angle of the boom relative to the cab, a second joint angle of the stick relative to the boom, a third joint angle of the bucket relative to the stick, a first actuator force exerted on the first actuator, a second actuator force exerted on the second actuator, and a third actuator force exerted on the third actuator. A plurality of physical characteristics of the machine are also determined by, for example, accessing a data-set in a memory. A processing device receives the signals from the sensing devices at least two instances in time and, using dynamic equations, determines the mass or weight of the bucket and any payload in it as a function of the received signals and the predetermined physical characteristics of the machine. In the dynamic equations, the location of the center of mass of the bucket is expressed in terms of the unknown parameters, however the location of the center of mass of both the stick and the boom (in a fixed xy coordinate system) are assumed as known terms. The determination of the mass/weight of the bucket and payload may be made while one or all of the boom, stick, and bucket is in motion.

Although machines of the prior art may determine the mass/weight of the payload while one or all of the boom, stick, and bucket is in motion, changes in the location of the center of mass of the linkages may create inaccuracies in the determined mass.

The disclosed machine system is directed to overcoming one or more of the problems set forth above.

SUMMARY

In one aspect, the present disclosure is directed to a payload calculation system for use with a work implement having at least two linkage members. The payload calculation system may include at least one state sensor configured to measure a state of the at least two linkage members. The payload calculation system may also include a processing device in communication with the at least one state sensor. The processing device may account for changes in a center of gravity of each of the at least two linkage members. The processing device may also be configured to use the at least one state sensor to determine a mass of a payload moved by the work implement.

In another aspect, the present disclosure is directed to a method of calculating a payload. The method may include actuating one of at least two linkage members to move a load and measuring a force at the at least two linkage members. The method may also include measuring a state of the at least two linkage members. The method may further include calculating a mass of the load using the measured force and the measured state while taking into account changes in a center of gravity of each of the at least two linkage members.

DETAILED DESCRIPTION

Figure 1:
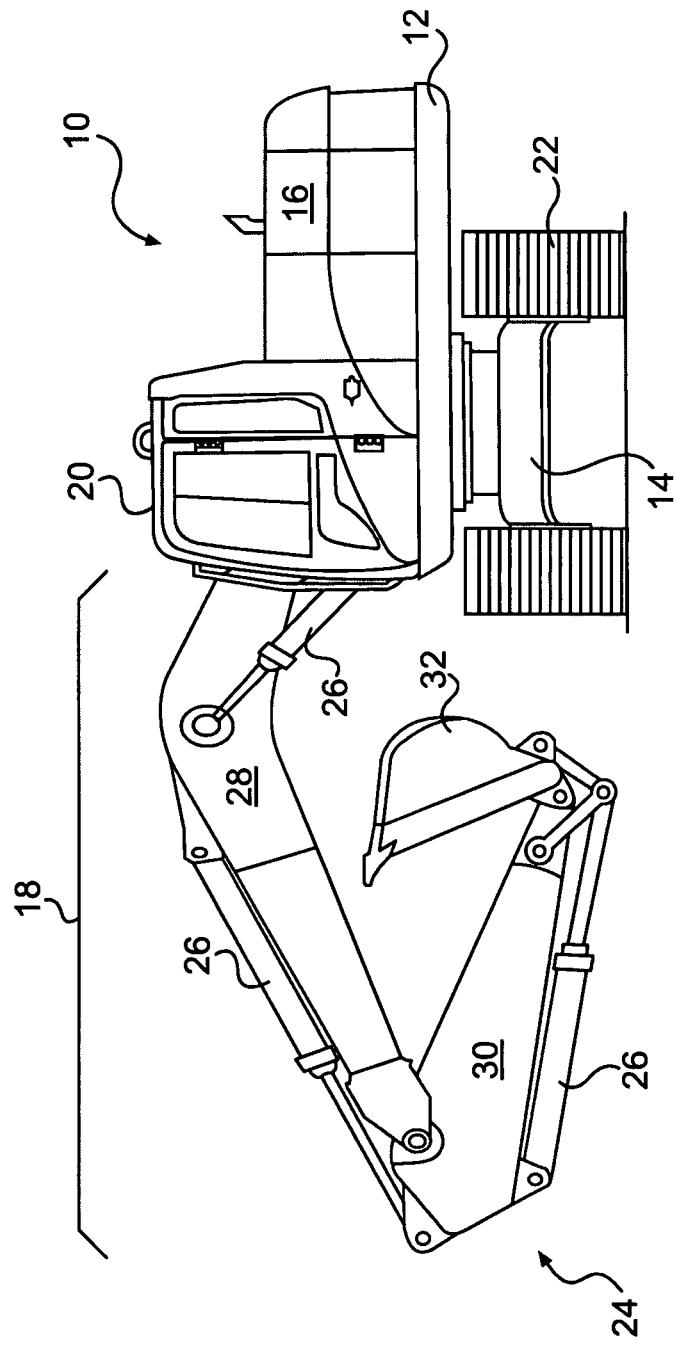
FIG. 1 is a diagrammatic illustration of an exemplary disclosed machine.

FIG. 1 illustrates an exemplary machine 10. Machine 10 may be a mobile machine that performs some type of operation associated with an industry such as mining, construction, farming, transportation, or any other industry known in the art. For example, machine 10 may be an earth moving machine, such as an excavator, a wheel loader, a backhoe, or any other suitable earth moving machine known in the art. Machine 10 may include a platform 12, an undercarriage 14, a power source 16, and a work implement 18.

Platform 12 may be rotatably disposed on undercarriage 14 and may provide a base member (not shown) that connects with work implement 18. Platform 12 may also include an operator station 20 from which an operator may control the operation of machine 10.

Undercarriage 14 may be a structural support for one or more traction devices 22. Traction devices 22 may include tracks located on each side of machine 10 configured to allow translational motion of machine 10 across a work surface. Alternatively, traction devices 22 may include wheels, belts, or other traction devices known in the art. Any of traction devices 22 may be drivable and/or steerable.

Power source 16 may provide power for the operation of machine 10. Power source 16 may embody a combustion engine, such as a diesel engine, a gasoline engine, a gaseous fuel powered engine (e.g., a natural gas engine), or any other type of combustion engine known in the art. Power source 16 may alternatively embody a non-combustion source of power, such as a fuel cell or other power storage device coupled to a motor. Power source 16 may provide a rotational output to drive traction device 22, thereby propelling machine 10. Power source 16 may also provide power to rotate platform 12 relative to undercarriage 14.

Work implement 18 may include one or more linkage members 24 designed to achieve a particular task. Specifically, linkage members 24 may embody a boom member 28, a stick member 30, and a work tool 32. A first end of boom member 28 may be pivotally connected to platform 12, and a second end of boom member 28 may be pivotally connected to a first end of stick member 30. Work tool 32 may be pivotally connected to a second end of stick member 30. It is contemplated that work tool 32 may embody, for example, a bucket, a grappler, a fork, a lifting hook, or any other appropriate work tool known in the art. Each linkage member 24 may include and be actuated by one or more actuators 26. It is contemplated that linkage members 24 may translate or rotate in a plane that is approximately orthogonal to the work surface.

Figure 2:
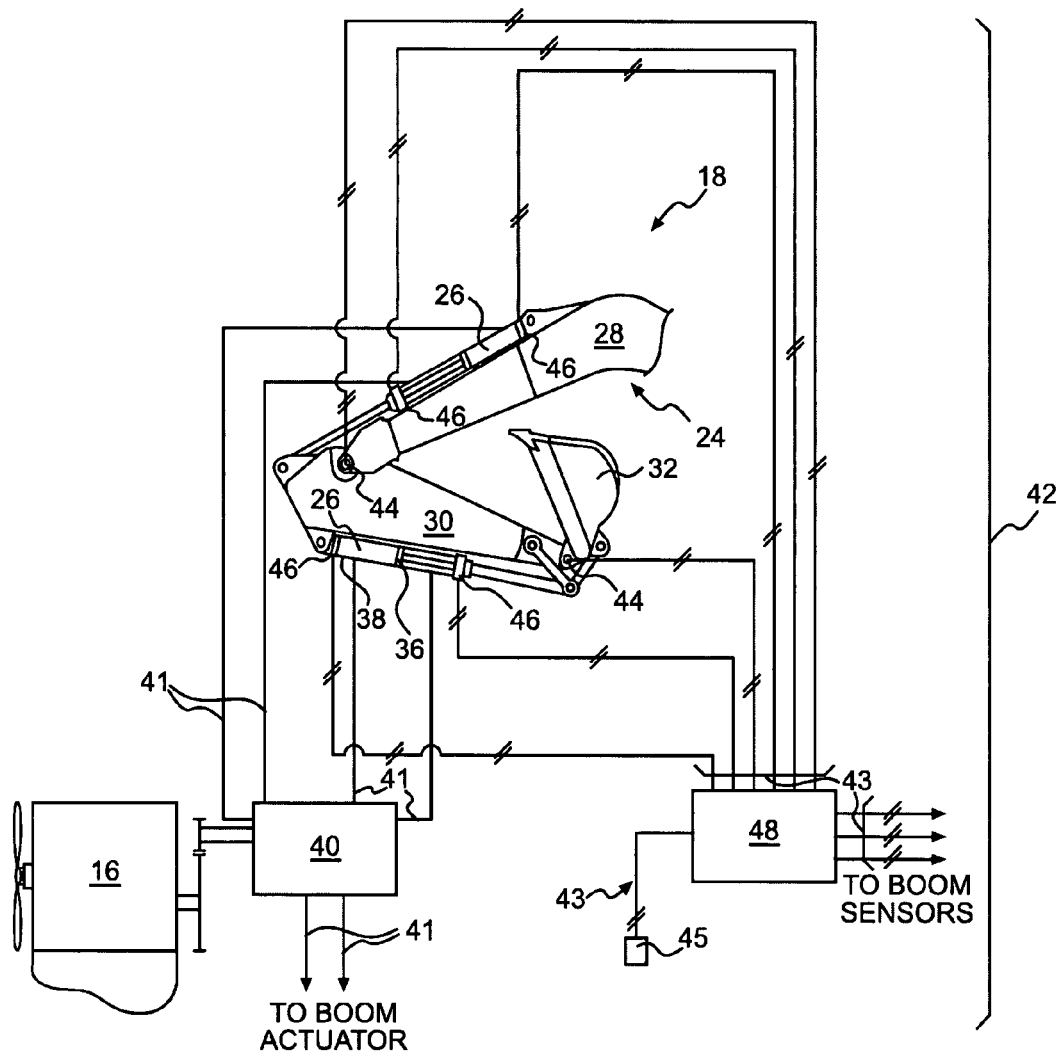
FIG. 2 is a schematic and diagrammatic illustration of an exemplary disclosed payload calculation system that may be used with the machine of FIG. 1.

As shown in FIG. 2, each actuator 26 may be a hydraulic cylinder that includes, for example, a piston assembly 36 and a tube 38. Piston assembly 36 may include two hydraulic surfaces, one surface associated with a first chamber and another surface associated with a second chamber. The first and/or second chambers may be selectively supplied with a pressurized fluid and drained of the pressurized fluid to create an imbalance of forces on the two hydraulic surfaces. The imbalance of forces may cause piston assembly 36 to axially displace within tube 38. It is also contemplated that actuators 26 may alternatively embody electric motors, pneumatic motors, or any other actuation devices known in the art.

A hydraulic system 40 may provide pressurized fluid to power each actuator 26. Specifically, hydraulic system 40 may include a pump (not shown) and a plurality of control valves (not shown). The pump (powered by a rotational output of power source 16) may pressurize a hydraulic fluid that is communicated to the plurality of control valves. The plurality of control valves may selectively supply the pressurized fluid via one or more hydraulic lines 41 to the first and/or second chambers of actuators 26, thus causing the axial displacement of piston assembly 36. It is contemplated that hydraulic system 40 may include additional or different components, such as, for example, accumulators, check valves, pressure relief or makeup valves, pressure compensating elements, restrictive orifices, and other hydraulic components known in the art.

As further shown in FIG. 2, machine 10 may include a payload calculation system 42 configured to calculate a mass (or weight) moved by work implement 18. Payload calculation system 42 may include one or more state sensors 44, an attitude sensor 45, one or more force sensors 46, and a processing device 48.

State sensors 44 may be angle sensing devices located near one or more joints of linkage members 24 (i.e., joint between work tool 32 and stick member 30, joint between stick member 30 and boom member 28, and joint between boom member 28 and platform 12). State sensors 44 may include rotary encoders, potentiometers, or other angle or position sensing devices (e.g., state sensor 44 may be located on a linear actuator and may be configured to determine a joint angle using an actuator position). Output signals of state sensors 44 may be used to determine a state of work implement 18, such as, for example, a position, a velocity, an acceleration, an angle, an angular velocity, and an angular acceleration of each linkage member 24.

Force sensors 46 may be configured to output a signal usable to determine a force created or experienced by actuators 26 and/or linkage members 24. For example, force sensors 46 may embody pressure sensors located and configured to measure the pressure of the pressurized fluid within or supplied to the first and/or second chambers of actuators 26. It is contemplated that processing device may use the measured pressure along with the physical dimensions of actuators 26 and linkage members 24 to determine joint torques of linkage members 24. Force sensors 46 may alternatively embody strain gauges, piezoelectric transducers, or other force sensing devices located at linkage joints, actuator joints, or any other appropriate location.

Attitude sensor 45 may measure the pitch and roll of machine 10. Attitude sensor may be located at any appropriate location on machine 10, such as, for example, at operator station 20. Attitude sensor 45 may embody one or more gyroscopes, accelerometers, gravitational inclinometers, or any combination thereof.

Processing device 48 may monitor and/or modify the performance of machine 10 and its components. Processing device 48 may communicate wirelessly or via one or more communication lines 43 with state sensors 44, attitude sensor 45, and force sensors 46. It is contemplated that processing device 48 may also communicate (not shown) with power source 16, operator station 20, hydraulic system 40, and/or other components of machine 10.

Processing device 48 may embody a single microprocessor or multiple microprocessors. Numerous commercially available microprocessors may be configured to perform the functions of processing device 48, and it should be appreciated that processing device 48 may readily embody a general machine microprocessor capable of monitoring and/or controlling numerous machine functions. Processing device 48 may include a memory, a secondary storage device, a processor, and any other components for running an application. Various other circuits may be associated with processing device 48, such as, for example, power supply circuitry, signal conditioning circuitry, data acquisition circuitry, signal output circuitry, signal amplification circuitry, and other types of circuitry known in the art. Processing device 48 may include one or more maps stored within the internal memory of processing device 48. Each of these maps may include a collection of data in the form of tables, graphs, and/or equations. Processing device 48 may include a dynamic model, a calibration procedure, and an estimation procedure.

The dynamic model may include an equation that relates the joint torques T to other measurable and/or calculable terms. T may be a vector or array that includes joint torque values at each joint of work implement 18, such as, for example, $T_{bo}$, $T_{st}$, and $T_{wt}$ (see FIG. 3). It is contemplated that the dynamic model may include any appropriate model known in the art (e.g., mathematical or logic-based relationship). One example of an acceptable dynamic model is:

$$T = M(q)\ddot{q} + N(q,\dot{q})\dot{q} + G(q) + F(\dot{q}), \quad (1)$$

where q is the linkage-state vector, M(q) is the inertia matrix, N(q,q̇) is the matrix of Coriolis and centrifugal terms, G(q) is the gravity torque matrix, and F(q̇) is the friction matrix. The joint torque relationship may be converted and represented as a linear-in-the-parameters model of the following form:

$$T = W(q, \dot{q}, \ddot{q})\Psi, \quad (2)$$

where $W(q,\dot{q},\ddot{q})$ is a matrix of nonlinear functions and $\Psi$ is a parameter vector.

$$\Psi = \begin{bmatrix} \psi(1) \\ \psi(2) \\ \vdots \\ \psi(n) \end{bmatrix} \quad (3)$$

Figure 3:
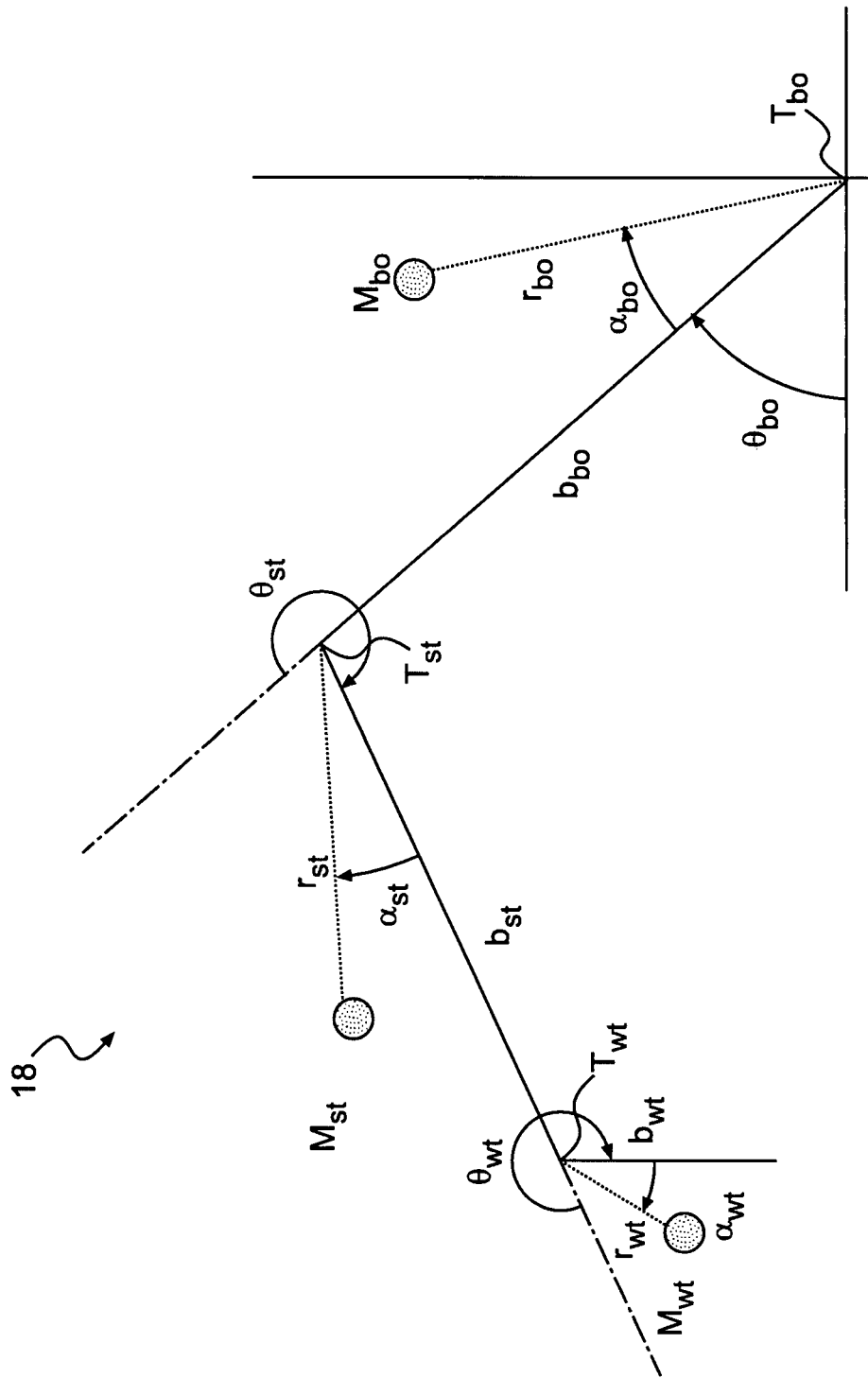
FIG. 3 is a schematic of an exemplary disclosed work implement.

Each element $\psi$ of the parameter vector $\Psi$ may include terms related to the linkage member's dimensions mass M, inertia I, and center-of-gravity ("CG") location. For example, the parameter vector may be represented as:

$$\Psi = \begin{bmatrix} I_{wt} + M_{wt}r_{wt}^2 \\ I_{st} + M_{st}r_{st}^2 + M_{wt}b_{st}^2 \\ I_{bo} + M_{bo}r_{bo}^2 + (M_{st} + M_{wt})b_{bo}^2 \\ M_{wt}r_{wt}\cos(\alpha_{wt}) \\ M_{wt}r_{wt}\sin(\alpha_{wt}) \\ M_{wt}b_{st} + M_{st}r_{st}\cos(\alpha_{st}) \\ M_{st}r_{st}\sin(\alpha_{st}) \\ (M_{wt} + M_{st})b_{bo} + M_{bo}r_{bo}\cos(\alpha_{bo}) \\ M_{bo}r_{bo}\sin(\alpha_{bo}) \end{bmatrix} \quad (4)$$

where, as also shown in FIG. 3, $\alpha$ and r are the angle and the radius defining the CG location of a given linkage member, the origin of r being the linkage member's joint (the given linkage member may be boom member 28, stick member 30, or work tool 32), b is the length of the given linkage member, the subscript "wt" designates a term related to work tool 32, "st" designates a term related to stick member 30, and "bo" designates a term related to boom member 28.

Returning to FIG. 2, the calibration procedure may be used for calibrating of payload calculation system 42. Processing device 48 may commence the calibration procedure by gathering multiple sets of data for calculation of the parameter vector $\Psi$.

For example, processing device 48 may vary each linkage member angle $\theta_{bo}$, $\theta_{st}$, and $\theta_{wt}$ (see FIG. 3) through a range of values (e.g., $\theta_{bo,1}$, $\theta_{st,1}$, $\theta_{wt,1}$; $\theta_{bo,2}$, $\theta_{st,2}$, $\theta_{wt,2}$; $\theta_{bo,3}$, $\theta_{st,3}$, $\theta_{wt,3}$ ... $\theta_{bo,n}$, $\theta_{st,n}$, $\theta_{wt,n}$). It is contemplated that processing device 48 may vary $\theta_{bo}$, $\theta_{st}$, and $\theta_{wt}$ continuously or discretely. As $\theta_{bo}$, $\theta_{st}$, and $\theta_{wt}$ are varied, processing device 48 may take measurements from state sensors 44, attitude sensor 45, and/or force sensors 46 (the measurements may include or may be readily converted to, for example, an angle, a position, a force, and/or a torque associated with linkage members 24 or the linkage member joints). Processing device 48 may take measurements at predetermined angles or at a predetermined frequency as $\theta_{bo}$, $\theta_{st}$, and $\theta_{wt}$ are varied. Thus, the measurement data used for calibration may include joint torques measured at a plurality of angles (e.g. $T_{\theta_{bo,1},\theta_{st,1},\theta_{wt,1}}$, $T_{\theta_{bo,2},\theta_{st,2},\theta_{wt,2}}$, $T_{\theta_{bo,3},\theta_{st,3},\theta_{wt,3}}$ ... $T_{\theta_{bo,n},\theta_{st,n},\theta_{wt,n}}$). Processing device 48 may use the multiple sets of measurement data in combination with pre-programmed linkage data (e.g., physical dimensions of linkage members 24) to calculate a value of the parameter vector $\Psi$ for each plurality of angles (e.g. $\Psi_{\theta_{bo,1},\theta_{st,1},\theta_{wt,1}}$, $\Psi_{\theta_{bo,2},\theta_{st,2},\theta_{wt,2}}$, $\Psi_{\theta_{bo,3},\theta_{st,3},\theta_{wt,3}}$ ... $\Psi_{\theta_{bo,n},\theta_{st,n},\theta_{wt,n}}$). Processing device 48 may calculate each parameter vector using for example, Equation (2) in combination with a least squares algorithm.

The dynamic model, and more specifically the calculated parameter vectors $\Psi_{\theta_{bo,1},\theta di\ st,1,\theta_{wt,1}}$, $\Psi_{\theta_{bo,2},\theta di\ st,2,\theta_{wt,2}}$, $\Psi_{\theta_{bo,3},\theta di\ st,3,\theta_{wt,3}}$ ... $\Psi_{\theta_{bo,n},\theta di\ st,n,\theta_{wt,n}}$ may undergo a compensation that may combine the calculated parameter vectors into a single a compensated parameter vector $\Psi_{comp}$. To obtain $\Psi_{comp}$, processing device 48 may fit a polynomial function to one or more of calculated parameter vector elements $\psi$ as its value varies with a predetermined linkage member angle. For example, processing device 48 may fit a polynomial to the sixth parameter vector element $\psi(6)$ as a function of $\theta_{wt}$, and the eight parameter vector element $\psi(8)$ as a function of $\theta_{st}$, etc.

In general form, each compensated parameter vector element $\psi_{comp}$ may be expressed as:

$$\psi_{Comp} = k_1\theta + k_2\theta^2 + k_3\theta^3, \quad (5)$$

where $k_1$, $k_2$, $k_3$ are constants from the polynomial curve-fit. It is contemplated that the compensated parameter vector may allow the dynamic model to account for changes in a linkage member's CG due to, for example, inflow or outflow of pressurized fluid within actuators 26, axial displacement of piston assembly 36 within tube 38, any movement of actuator 26 away from linkage member 24, loading of material into work tool 32, and other possible causes of CG change. It is further contemplated that processing device 48 may compensate the parameter vector elements related to any one of or any combination of linkage members 24 (e.g., parameter vector elements related to boom member 28 alone; both boom member 28 and stick member 30; or boom member 28, stick member 30, and work tool 32). During the calibration step, processing device 48 may check the compensated parameter vector against preprogrammed limits to ensure that the compensated parameter vector is within a predefined range. Processing device 48 may then store the compensated parameter vector.

The estimation procedure may be used for estimation of a mass of a payload moved by work implement 18 (payload may be a material, an object, or any other mass). To estimate the mass of the payload $M_{PL}$, Equation (2) may be written as:

$$T = W(q,\dot{q},\ddot{q})\Psi_{comp} + \hat{W}(q,\dot{q},\ddot{q})M_{PL} \quad (6)$$

where $\hat{W}(q,\dot{q},\ddot{q})$ is a second matrix of nonlinear functions. In an exemplary operation, the operator may command work implement 18 to pick up and move a material or object to a new location where it may be unloaded. While moving the material or object, processing device 48 may receive data from state sensors 44 and force sensors 46. The data from state sensors 44 (i.e., state data) may include, for example, a position, a velocity, an acceleration, an angle, an angular velocity, or an angular acceleration of each linkage member 24. Processing device 48 may use the received sensor data (i.e., state data and joint torque data) and the pre-programmed linkage data to determine and/or set the values for T, $W(q,\dot{q},\ddot{q})$, $\Psi_{comp}$, and $\hat{W}(q,\dot{q},\ddot{q})$ of Equation (6). In other words, the joint toque data may be used to set T, $\Psi_{comp}$ may be determined a priori (e.g., from calibration), and $W(q,\dot{q},\ddot{q})$ and $\hat{W}(q,\dot{q},\ddot{q})$ may be determinable using the sensor data and/or the pre-programmed linkage data. Processing device 48 may then use a least squares technique and/or an adaptive estimation technique (based on Lyapunov theory) to calculate $M_{PL}$.

INDUSTRIAL APPLICABILITY

The disclosed payload calculation system may be applicable to any machine where calculation of a payload is desired. The compensation for center of gravity changes may increase the accuracy of the payload measurements. Improved accuracy may improve the productivity of a particular operation in which the disclosed machine is involved. The operation of payload calculation system 42 will now be described.

Figure 4:
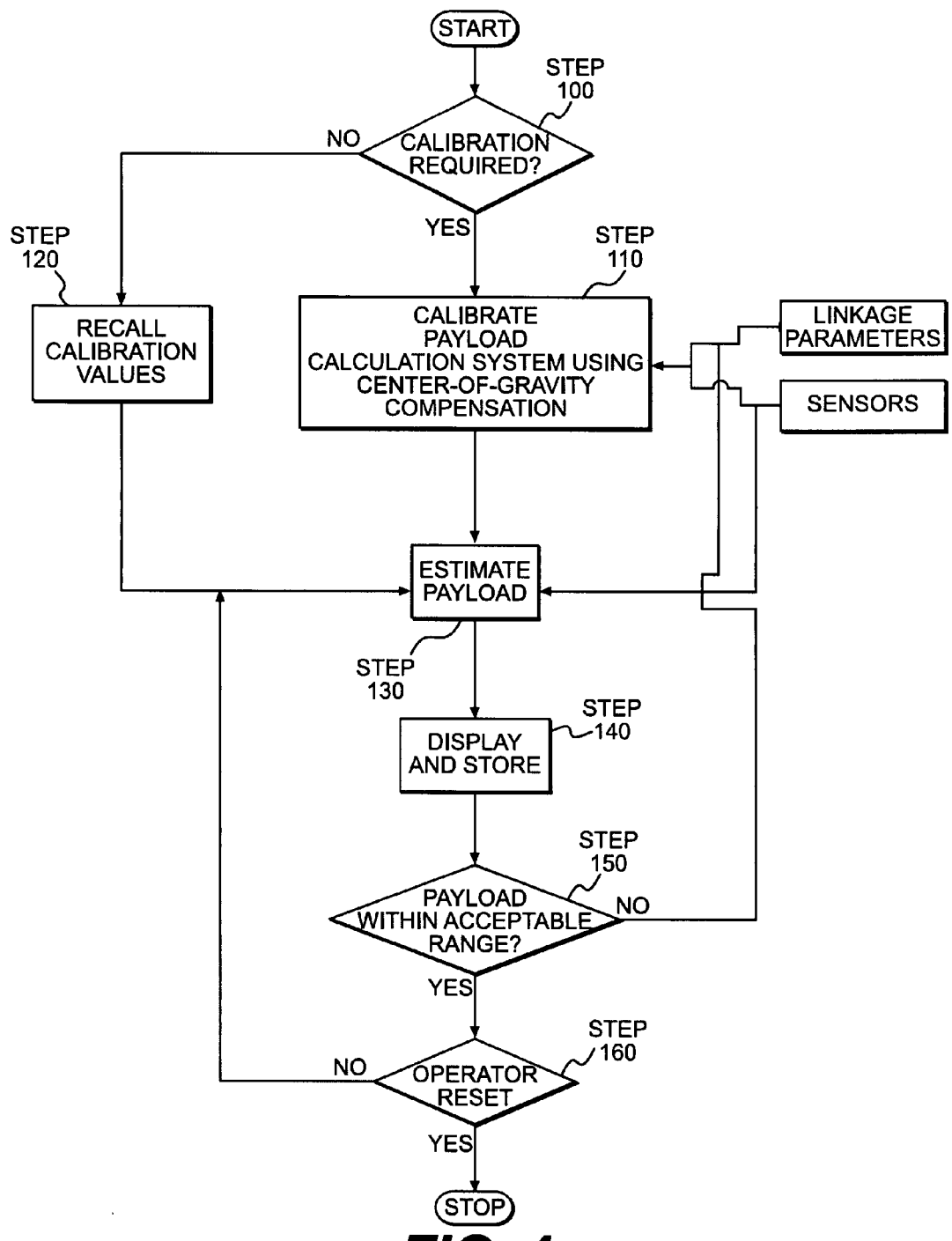
FIG. 4 is a flowchart depicting an exemplary operation of the payload calculation system illustrated in FIG. 2.

As shown in FIG. 4, processing device 48 may first determine if the dynamic model of payload calculation system 42 requires calibration (step 100). Processing device 48 may require calibration of the dynamic model on a set periodic basis or upon a user command. If the dynamic model of payload calculation system 42 requires calibration, processing device 48 may commence the calibration procedure (step 110). During the calibration procedure, processing device 48 may vary the angles of linkage members 24 and receive measurements from state sensors 44, attitude sensor 45, and force sensors 46. The sensor data may be used to calculate the parameter vector of the dynamic model. The calculated parameter vector $\Psi$, may then undergo compensation to obtain the compensated parameter vector $\Psi_{comp}$. If payload calculation system 42 has already been calibrated, processing device 48 may recall the compensated parameter vector from the previous calibration (step 120).

Once calibrated, payload calculation system 42 may calculate the mass of the payload moved by work implement 18 (step 130). For example, machine 10 (see FIG. 1) may be performing a loading operation where it is loading material onto a transport vehicle (not shown). During the loading operation, the operator may command work implement 18 to pick up, move, and thereafter dump a load of material onto the transport vehicle. While moving the load, processing device 48 may receive data from state sensor 44 and force sensors 46. Processing device 48 use the received sensor data (i.e., state data and joint torque data) and the pre-programmed linkage data to determine or set the values for T, $W(q,\dot{q},\ddot{q})$, $\Psi_{comp}$, and $\hat{W}(q,\dot{q},\ddot{q})$ of Equation (6). Processing device may then use a least squares technique and/or an adaptive estimation technique (based on Lyapunov theory) to calculate the mass of the payload $M_{PL}$ from Equation (6).

Once the payload estimation procedure (i.e., step 130) is complete, processing device 48 may display and/or store the calculated payload mass (step 140). It is contemplated that a cumulative calculated payload mass (over a given time period or work cycle) may also be displayed and/or stored.

Processing device 48 may then check the calculated payload mass against a map to determine if the calculated payload mass is within a predefined acceptable range (step 150). The acceptable range may define, for example, the feasible range of masses movable by work implement 18 in a particular period of time. If the calculated payload mass is not within the predefined acceptable range, processing device 48 may re-calculate the payload mass (return to step 130). If the payload mass is within the acceptable range, processing device 48 may determine if the operator has commanded a reset of the payload calculation system 42 via one or more operator input devices located at operator station 20 (step 160). If the operator reset has been commanded, processing device 48 may discontinue the payload measuring routine. Alternatively, processing device 48 may return to estimating the payload mass (return to step 130).

Several advantages of the payload calculation system may be realized. In particular, the compensation for the center of gravity of each of the linkage members may increase the accuracy of the mass measurements. Improved measurements of the payload mass may improve productivity by allowing the disclosed machine to load an associated transport vehicle or container nearer to its maximum capacity. By better ensuring a maximum load with no overload, the disclosed payload calculation system may also decrease maintenance costs of the associated transport vehicle or decrease costly delays in cases where excess material must be removed prior to transport.

It will be apparent to those skilled in the art that various modifications and variations can be made to the disclosed payload calculation system without departing from the scope of the disclosure. Other embodiments of the payload calculation system will be apparent to those skilled in the art from consideration of the specification and practice of the payload calculation system disclosed herein. It is intended that the specification and examples be considered as exemplary only, with a true scope being indicated by the following claims.

What is claimed is:

1. A payload calculation system for use with a work implement having at least two linkage members, comprising:
   at least one state sensor configured to measure a state of the at least two linkage members; and
   a processing device in communication with the at least one state sensor, wherein the processing device is configured to:
   receive a center of gravity of each of the at least two linkage members;
   calculate a plurality of parameter vectors at different angles, the parameter vectors being based on the center of gravity of each of the at least two linkage members;
   based on the parameter vectors, calculate a compensated parameter vector that accounts for changes in the center of gravity of each of the at least two linkage members;
   determine a mass of a payload of the work implement using the at least one state sensor and the parameter vector; and
   determine if the calculated payload is within a predetermined range of payloads.

2. The payload calculation system of claim 1, wherein each of the at least two linkage members includes an actuator.

3. The payload calculation system of claim 2, wherein the actuators are hydraulic actuators and the at least two linkage members include a boom member, a stick member, and a work tool.

4. The payload calculation system of claim 2, further including one or more force sensors configured to measure a force at the actuators, wherein the processing device is in communication with the one or more force sensors, and the processing device is configured to use one or more force sensors to determine the mass of the payload.

5. The payload calculation system of claim 4, wherein the processing device includes a model and the processing device uses the model to determine the mass of the payload.

6. The payload calculation system of claim 5, wherein the processing device is configured to calibrate the model by varying an angle of each of the at least two linkage members while receiving measurements from the one or more force sensors and the at least one state sensor.

7. The payload calculation system of claim 6, wherein the processing device is configured to use the received measurements to determine a plurality of calculated values, and the processing device is configured to fit a function to the plurality of calculated values as they vary with the angle.

8. The payload calculation system of claim 7, wherein the processing device is configured to calibrate the model prior to determining the mass of the payload of the work implement.

9. The payload calculation system of claim 5, wherein the processing device is configured to use an adaptive estimation technique to determine the mass of the payload.

10. The payload calculation system of claim 1, wherein the state includes at least one of an angle, an angular velocity, or an angular acceleration.

11. A machine capable of payload calculation using a work implement having a boom with an actuator, a stick, and a work tool, comprising:
- a force sensor configured to measure a force at the actuator;
- a state sensor configured to measure a state of the work implement; and
- a processing device, in communication with the force sensor and the state sensor, wherein the processing device is configured to:
- receive a center of gravity of the boom and a center of gravity of one of the stick or the work tool;
- calculate a parameter vector that accounts for changes in the center of gravity of the boom and the center of gravity of the one of the stick or the work tool;
- determine a mass of a payload of the work implement using the force sensor and the state sensor and the parameter vector; and
- determine if the payload is within a predetermined range of payloads.

12. The machine of claim 11, wherein the processing device accounts for changes in the center of gravity of the boom using a dynamic model and the dynamic model also accounts for changes in a center of gravity of each of the stick, the work tool, and the boom due at least to:
- inflow or outflow of pressurized fluid within actuators associated with the stick, the work tool, and the boom, and
- axial displacement of the actuators associated with the stick, the work tool, and the boom.

13. The machine of claim 12, wherein the processing device is configured to implement a calibration procedure, wherein the calibration procedure varies an angle of each of the stick, the boom, and the work tool while receiving measurements from the force sensor and the state sensor.

* * * * *